B. C. ZUHARS AND H. D. CLARKE.
TRANSMISSION SHIFTING MECHANISM.
APPLICATION FILED JAN. 21, 1920. RENEWED AUG. 20, 1921.
1,427,994.
Patented Sept. 5, 1922.
3 SHEETS—SHEET 1.
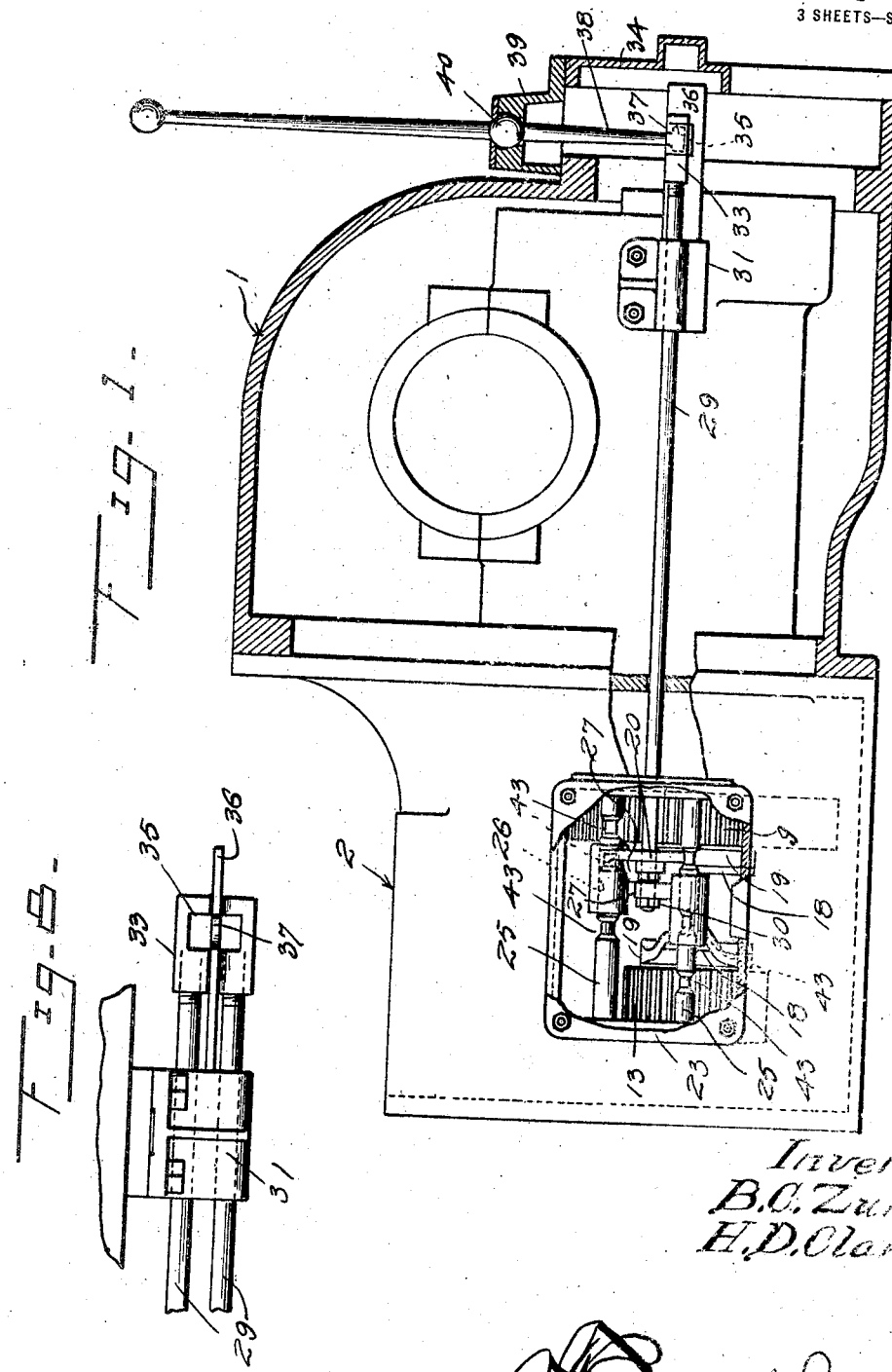
Inventors
B. C. Zuhars
H. D. Clarke
By A. Randolph Jr., Atty

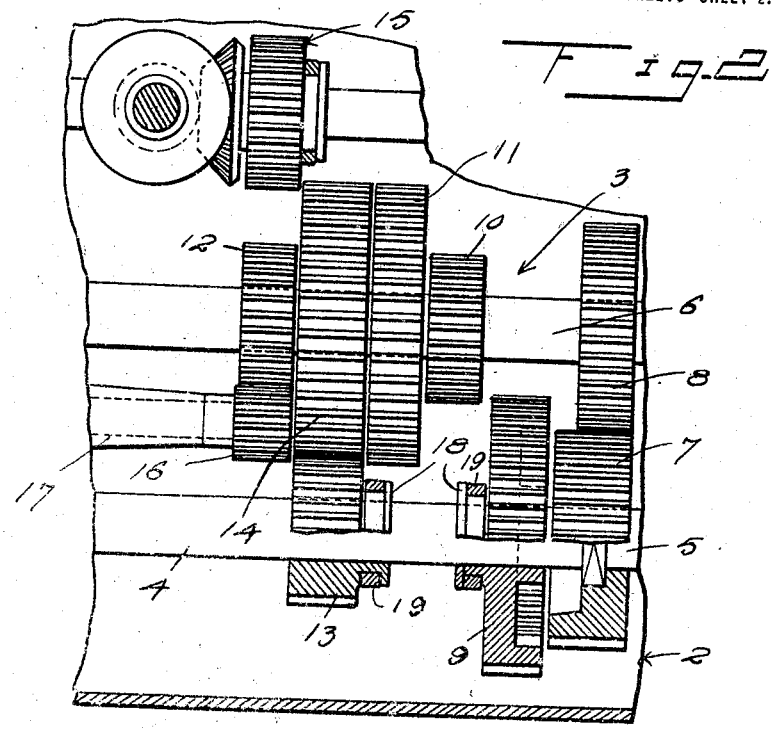
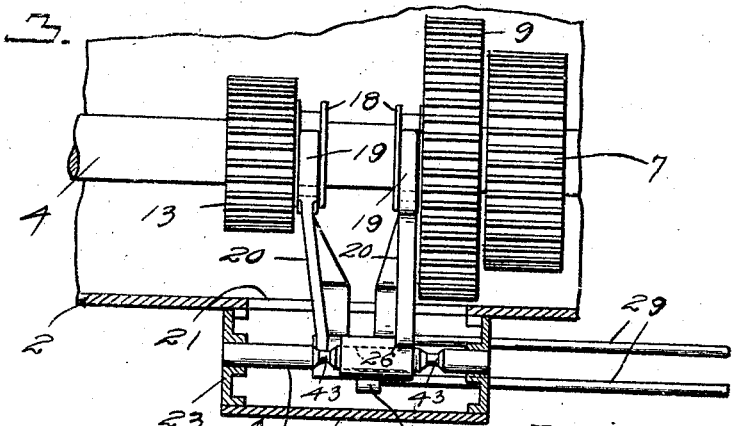

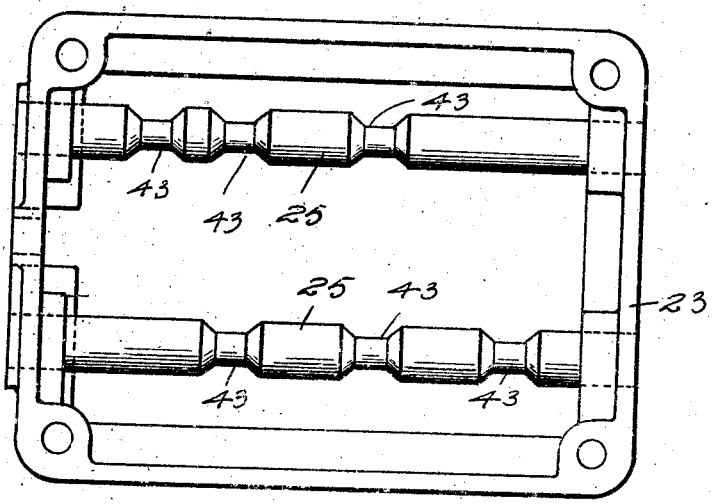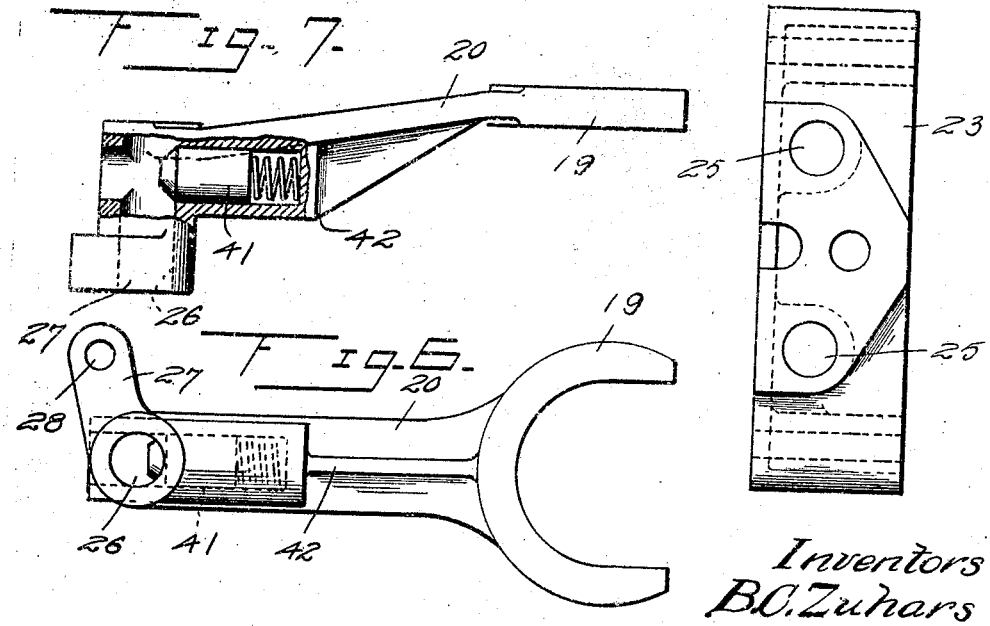

Patented Sept. 5, 1922.

1,427,994

UNITED STATES PATENT OFFICE.

BENJAMIN C. ZUHARS AND HARRY D. CLARKE, OF COLUMBUS, OHIO, ASSIGNORS TO THE OHIO TRACTOR COMPANY, OF COLUMBUS, OHIO, A CORPORATION OF OHIO.

TRANSMISSION-SHIFTING MECHANISM.

Application filed January 21, 1920, Serial No. 353,043. Renewed August 20, 1921. Serial No. 493,922.

*To all whom it may concern:*

Be it known that we, BENJAMIN C. ZUHARS and HARRY DON CLARKE, citizens of the United States, residing at Grand View Heights, Columbus, in the county of Franklin and State of Ohio, have invented certain new and useful Improvements in Transmission-Shifting Mechanisms; and we do hereby declare the following to be a full, clear, and exact description of the invention, such as will enable others skilled in the art to which it appertains to make and use the same.

This invention relates to new and useful improvements in transmission shifting mechanisms and has for its primary object the provision of means which permits the control lever to be located rearwardly of the transmission and differential of a motor vehicle or tractor and in convenient reach of the operator seated on the rear end of the tractor or vehicle.

Another object of this invention is the provision of means which permits a great proportion of the shifting rods of the transmission to be housed and protected by the differential housing of the tractor or vehicle.

A further object of this invention is the provision of means for supporting the forward ends of the shifting rods and forks thereof and is fastened onto the transmission housing which provides a neat, compact and convenient arrangement of parts.

A still further object of this invention is the provision of a transmission shifting mechanism of the above stated character, which shall be simple, durable and efficient, and which may be manufactured and sold at a comparatively low cost.

An essential feature of the invention is the employment of a single controlling lever so associated with the transmission mechanism that by one movement thereof a direct connection at intermediate speed will be made, while for high speed through the counter-shaft the opposite movement of the controlling lever will be made and for other speeds a connection will be made through the counter-shaft by a movement of the control that will become associated in the mind of the operator with these speeds.

This arrangement enables the operator in the easiest and most natural way to manipulate the control for all normal operations of the tractor, so as to start at intermediate speed by a direct connection of the driven and driving shafts, and thereby minimize the movements of the control and also eliminate the use of the gearing through the counter-shaft.

In the illustration disclosed herein the shifting gear for making the direct drive at intermediate is associated, also with the high speed gear, so that a single gear may be shifted from intermediate direct drive to the high speed, and for most normal operations such as plowing the operator will start at intermediate and continue at that speed, though for transporting purposes he may throw the gear to the high speed.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description, and accompanying drawings, in which:—

Figure 1 is a vertical sectional view, illustrating a transmission shifting mechanism constructed in accordance with our invention, Figure 2 is a fragmentary sectional view of the transmission which is actuated by our shifting mechanism, Figure 3 is a fragmentary longitudinal sectional view illustrating the connection between the shifting rods and the shifting gears of the transmission, Figure 4 is a rear elevation of a supporting casing, Figure 5 is an end elevation of the same, Figure 6 is a plan view illustrating one of the shifting forks, Figure 7 is a detail sectional view of one of the shifting forks illustrating a spring pressed plunger, Figure 8 is a fragmentary plan view illustrating a bracket for supporting the rear ends of the shifting rods.

Referring in detail to the drawings, the numeral 1 indicates a differential housing and 2 a transmission housing secured to said differential housing and which housing forms subject matter for a co-pending application, Serial Number 356,746, now Patent No. 1,360,857. A transmission 3 is located within the transmission housing 2 and forms the subject matter of another co-pending application, Serial Number 568,311, and includes a power shaft 4, a driven shaft 5 and a counter shaft 6. The driven shaft 5 is connected to the counter shaft 6 by gears 7 and 8 which are continuously in mesh with each other. A shifting gear 9 is splined to the drive shaft 4 and is provided with internal and external teeth and the internal teeth are adapted to mesh with the teeth of the gear 7 when the shifting gear 9 is in one position for the purpose of obtaining direct drive between the drive shaft 4 and the driven shaft 5. A gear 10 is secured to the counter shaft 6 and is adapted to be driven by the shifting gear 9 when in another position to obtain another speed to the driven shaft 5 from the drive shaft 4. Spaced speed changing gears 11 and 12 are secured to the counter shaft and a speed changing gear 13 is splined to the drive shaft 4 and is continuously in mesh with an idle gear 14 journaled on the counter shaft 6 and is disposed between the speed changing gears 11 and 12 and is of a width greater than said gears 11 and 12. The idle gear 14 is continuously driven by the shifting gear 13 and is adapted to drive a power take-off mechanism 15 which forms subject matter for another co-pending application.

The gear 12 is continuously in mesh with a reversing gear or pinion 16 journaled on a stub shaft 17 and on moving the shifting gear 13 in one direction, it will mesh with the reverse pinion or gear 16 to give a reverse drive to the transmission. By shifting the gear 13 in an opposite direction, the same is moved into mesh with the gear 11 giving another speed to the transmission in a forward direction over that heretofore referred to.

The shifting gears 9 and 13 are provided with grooved collars 18 to receive the bifurcated ends 19 of shifting forks 20 which extend through an opening 21 formed in the side of the transmission casing 2. The opening 21 is closed by a cover 22 in the form of a frame 23 which is bolted or otherwise secured to the transmission housing and is closed by a front wall 24. Supporting rods 25 are secured in the frame 22 and extend through openings 26 formed in the ends of the shifting forks 20. Lateral extensions 27 are formed on the ends of the shifting forks and are provided with openings 28 to receive the forward ends of shifting rods 29. The shifting rods 29 are secured to the extensions 27 by nuts 30. The shifting rods 29 extend rearwardly and pass into and through the differential housing 1 as clearly shown in Figure 1 and are slidably supported adjacent their rear ends by a bracket 31.

Blocks 33 are secured to the rear ends of the shifting rods 29 and are located in an auxiliary housing 34 which is formed integrally with the differential housing 1, and each block 33 is provided with a notch 35. A division plate 36 is located in the auxiliary housing 34 and is disposed between the blocks 33 and is provided with a notch 37 which normally receives the inner end of a shifting lever 38 and also permits the inner end of this shifting lever to be moved into the notches of said blocks 33 for connecting said levers to either of the shifting rods 29 providing a construction wherein either of the shifting gears 13 or 9 can be moved forwardly and rearwardly to obtain the various speeds to the transmission 3. A socketed member 39 is carried by the auxiliary housing 34 and receives a ball 40 on the shifting lever 38 so that said shifting lever can be rocked for moving its inner end into engagement with either of the notches 35 of the blocks 33 or in the notch 37 of the division plate 36 which is the neutral position of the shifting lever.

Spring actuated plungers 41 are seated in casings 42 formed integrally with the shifting forks and said plungers are adapted to engage in spaced grooves 43 formed in the supporting rods 25 for the purpose of holding the shifting gears 13 and 9 in their various positions. The shifting gears each have three positions, two of said positions are gear meshing positions and the other position is neutral and the supporting rods 25 are provided with a corresponding number of grooves so that the shifting gears are held in their various positions when the plungers 41 engage the grooves of the supporting rods 25.

From the foregoing description taken in connection with the accompanying drawings, it will be noted that a shifting mechanism for a transmission has been provided which can be easily and conveniently installed on a transmission and wherein the shifting rods of said mechanism are substantially housed within the differential housing of the tractor or vehicle to protect them from injury and also provides a construction wherein the shifting lever can be located rearwardly of the differential housing and in convenient reach of an operator positioned on the rear end of the tractor or motor vehicle.

While we have shown and described the preferred embodiment of our invention, it will be understood that minor changes in construction, combination, and arrangement of parts may be made without departing from the spirit and scope of the invention as claimed.

Having thus described our invention, what we claim is:—

1. A transmission shifting mechanism including a transmission housing with transmission shifting gears of a differential housing extending rearwardly of the transmission housing, control means carried by the differential housing, and means connecting said control means to the shifting gears.

2. A transmission shifting mechanism including a transmission housing with a transmission shifting gear and a differential housing extending rearwardly of the transmission housing, an auxiliary housing carried by the differential housing, control means carried by the auxiliary housing and extending through the differential housing, and means connecting said control means to the shifting gears.

3. A transmission shifting mechanism including a transmission housing with transmission shifting gears and a differential housing extending rearwardly of the transmission housing, an auxiliary housing at the rear of the differential housing, shifting rods extending from the auxiliary housing to the transmission housing and through the differential housing, control means for said shifting rods, and means connecting the shifting rods to the shifting gears.

4. A transmission shifting mechanism including a transmission housing with transmission shifting gears and a differential housing extending rearwardly of the transmission housing, a control element carried by the rear portion of the differential housing, shifting rods connected to the control element and extending through the differential housing to the transmission housing, and forks secured to the shifting rods and to the shifting gears.

5. A transmission shifting mechanism including a transmission housing with transmission shifting gears and a differential housing extending rearwardly of the transmission housing, a control element carried by the rear portion of the differential housing, shifting rods slidably mounted in the differential housing and having connection with the control element and extending forwardly to the transmission housing, a frame carried by the transmission housing, and forks slidable in said frame and connected to the shifting gears and to the shifting rods.

6. A transmission shifting mechanism including a transmission housing having a slot and transmission shifting gears therein and a differential housing extending rearwardly of the transmission housing, a control element carried by the rear portion of the differential housing, shifting rods slidably mounted in the differential housing and connected to the control element and extending forwardly through the differential housing to the opening in the transmission housing, a casing secured to the transmission housing and closing the opening thereof and slidably receiving the forward ends of the shifting rods, supporting shafts carried by said casing and having spaced grooves, forks connected to the shifting gears and slidable on said supporting shafts and connected to the forward ends of the shifting rods, and spring pressed plungers carried by the forks and adapted to engage the grooves.

In testimony whereof we affix our signatures in presence of two witnesses.

BENJAMIN C. ZUHARS.
HARRY D. CLARKE.

Witnesses:
WILLIAM F. GARRETT,
JAMES F. LANGHEAD.